Oct. 27, 1931.   L. O. CARLSEN   1,829,263
GEAR CUTTING MACHINE
Filed Dec. 15, 1930
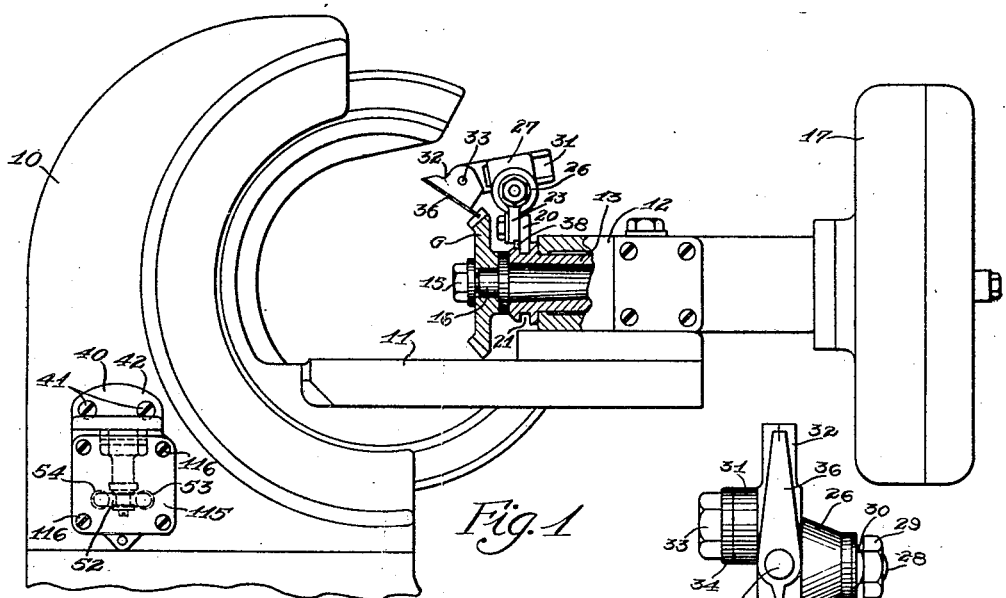
Fig. 1
Fig. 2
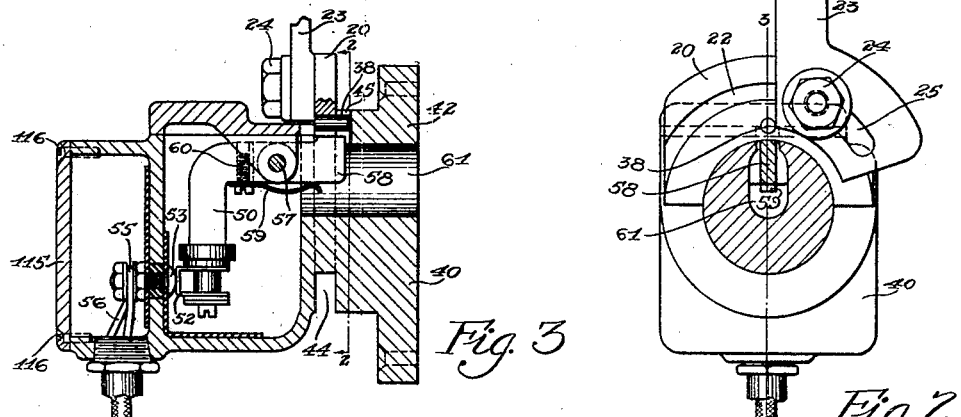
Fig. 3
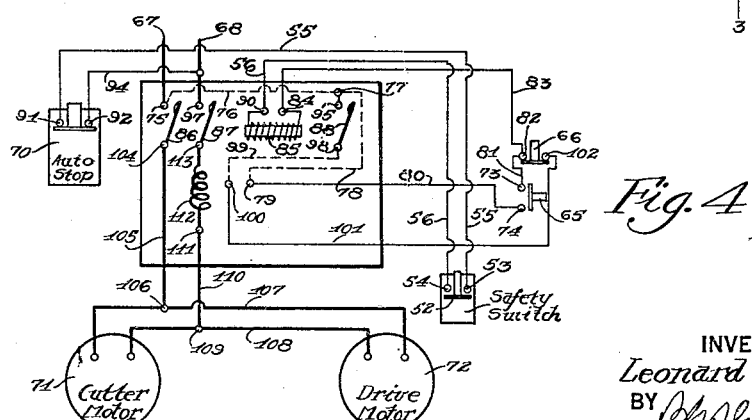
Fig. 4
INVENTOR
Leonard O. Carlsen
BY
P. Schlesinger
ATTORNEY Patented Oct. 27, 1931

1,829,263

UNITED STATES PATENT OFFICE

LEONARD O. CARLSEN, OF ROCHESTER, NEW YORK, ASSIGNOR TO GLEASON WORKS, OF ROCHESTER, NEW YORK, A CORPORATION OF NEW YORK

GEAR CUTTING MACHINE

Application filed December 15, 1930. Serial No. 502,475.

The present invention relates to gear cutting machines and particularly to machines for finish-cutting gears.

When setting up to finish-cut a roughed gear blank on a gear cutting machine, the operator first divides stock, that is, he gauges the angular position of the blank on the work spindle. This he does to be sure that the cutting tool or tools will operate in the correct relation to the tooth sides of the blank when the blank and tools are brought into cutting engagement. The gauge employed for dividing stock is known as a stock-dividing gauge. The stock-dividing gauge furnished with most gear cutting machines is a hand gauge which the operator slips onto the work spindle when gauging the blank and which is intended to be removed before the machine is started. Operators are sometimes careless or inattentive, however, and trouble is experienced now and then from an operator forgetting to take the stock dividing gauge off the work spindle before starting up the machine. The result is that when the machine is started, the stock-dividing gauge is thrown off the spindle and either the machine or the cutting tools are damaged or the gauge itself sprung or destroyed.

Various schemes have been suggested for preventing the operator from forgetting to remove the gauge from the spindle. Thus, in some shops, the operator is instructed to tie the gauge to his jumper or over-all so that if he happens to forget to remove the gauge his own movements will pull it off the work spindle. This is far from satisfactory from a safety viewpoint and also there is always the possibility of the gauge being damaged in being jerked off the machine. Other schemes which provide for automatically swinging the gauge out of the way have had the objection that they are both complicated and expensive.

The purpose of the present invention is to end completely and through very simple means all trouble arising from an operator forgetting the stock-dividing gauge. To this end, the gear cutting machine is constructed so that the operator must use the stock-dividing gauge to start the machine, which means he must first remove it from the work spindle. In the preferred construction, also, there is a support provided for the stock-dividing gauge apart from the work spindle and to start the machine and keep it running the stock-dividing gauge must be positioned on this support. Thereby the stock-dividing gauge is kept out of the way and in a place where it will be safe from damage.

There are various ways in which the purpose and object of the invention can be achieved. I prefer to accomplish it electrically by wiring the gear cutting machine so that the machine cannot be started or kept in motion unless the stock-dividing gauge is positioned in a convenient pocket at one side of the machine, which means, of course, that the stock-dividing gauge is safely off of the work spindle when the machine is put in operation and all the time it is in operation.

In the drawings:

Figure 1 is a fragmentary end elevation of a bevel gear generating machine of a standard design, showing a stock-dividing gauge on the work spindle of the machine and in use gauging the position of a bevel gear;

Figure 2 is an enlarged view showing the stock-dividing gauge and the bracket on which it is positioned while the machine is running. The view of the gauge is at right angles to the view of the gauge shown in Figure 1 while the view of the bracket is a sectional view on the line 2—2 of Figure 3;

Figure 3 is a section on the line 3—3 of Figure 2; and

Figure 4 is a wiring diagram of the gear cutting machine.

The gear cutting machine shown in the drawings is of the type described in the copending joint application of Maxwell H. Hill and the present inventor, Serial No. 394,350, filed September 21, 1929, but it is to be understood that the present invention is not limited in its application to that type of machine.

The machine illustrated is provided with a column indicated at 10 and on this column there is oscillatably mounted a cradle 11. The work head 12 of the machine is adjustably mounted on the cradle 11, and the work spindle 13 is journaled directly in the work head 12.

G indicates a bevel gear blank which is to be finish cut on the machine. This blank is secured by a bolt 15 to the arbor 16 that is mounted in the bore of the work spindle. 17 designates the guard which encloses the indexing mechanism of the machine.

The stock-dividing gauge employed with this machine may be of any suitable type. That shown in the drawings is of the construction described and claimed in the co-pending application above referred to. The gauge includes a collar portion 20 that, in use, is adapted to fit into a circular groove 21 turned in the periphery of the work spindle 13. There is an arcuate slot 22 cut in the front face of the collar 20. The center of curvature of this slot lies on the axis of the work spindle when the gauge is in position on the work spindle. 23 designates a bracket which is adjustable angularly on the collar 20 and which is secured in any adjusted position by means of a stud 24 that passes through an arcuate slot 25 in the bracket 23 and engages in the slot 22 of the collar. The member 23 is formed at one side with an enlarged head 26. There is a plate 27 pivotally mounted on the bracket 23 and this plate is held in any position of its angular adjustment by means of the stud 28 which passes through the enlarged head 26 of the bracket and by the nut 29 and spring washer 30 which are mounted on the stud. Mounted on the plate 27 for sliding adjustment thereon is a bar 31. Pivotally mounted on the bar at its forward end is a plate 32. This plate 32 is secured in any adjusted position on the bar 27 by means of the bolt 33 and washer 34. The plate 32 carries a stud 35 and on this stud there is pivotally mounted a finger 36. The lower end of the finger 36 is engaged in a slot of the roughed gear blank G to locate the blank in the proper angular position on the work spindle. The finger has an index mark at its upper end, as clearly shown in Figure 2, which reads against a similar mark on the face of the plate 32 when the blank is correctly positioned relative to the gauge. The gauge itself is accurately located on the work spindle by a pin 38 which engages in a notch in the periphery of the work spindle.

When the blank has been correctly positioned on the work spindle by use of the gauge, the gauge should be removed. I shall now describe how the present machine is arranged and wired to insure its removal.

There is a bracket 40 secured to the column 10 of the machine by screws 41 which pass through holes in the foot portion 42 of the bracket and thread into the column 10.

There is a circular groove 44 turned in the periphery of the bracket 40 and this groove is identical in dimension with the groove 21 turned in the periphery of the work spindle 13. There is, also, a notch 45 formed in the periphery of the bracket 40 in continuity with the groove 44 and of a size to receive the pin 38, which is secured in the collar 20 of the stock-dividing gauge. So, the stock-dividing gauge can be taken off the work spindle and placed on the bracket 40 with its collar 20 engaging in the groove 44 of the bracket and its pin 38 seating in a notch 45 of the bracket.

The portion of the bracket 40 which extends beyond the groove 44 is shaped to form a switch-box. There is a switch arm 50 pivotally mounted within the box. This arm is in the form of a bell-crank lever. At one end it carries a contact plate 52 which is adapted to engage the terminals 53 and 54 of the lines 55 and 56. Loosely mounted on the bolt 57 that serves as a pivot for the switch arm 50 is a finger 58. This finger extends through an opening 61 in the bracket casting into the groove 44 thereof in position to be engaged by the collar 20 of the stock-dividing gauge when the stock-dividing gauge is positioned on the bracket. A flat spring 59 which is secured to the switch arm 50 by a screw 60 engages the finger 58, constantly urging the finger upwardly. The construction is such that when the finger 58 is depressed, the switch arm 50 is swung about its pivot 57 because the flat spring 59 transmits the downward movement of the finger 58 to the arm 50.

The weight of the switch arm 50 is such as to normally break contact between the bar 52 and the terminals 53 and 54. Contact is made only when the stock-dividing gauge is in position on the bracket. The switch is incorporated in the main electrical circuit of the machine with the consequence that the circuit will only be closed when the stock-dividing gauge is in position on the bracket. The result is that the machine cannot be started or kept running unless the stock-dividing gauge has been removed from the work spindle and positioned on the bracket 40. Thus, all danger of injury to the gauge or damage to the machine or to the tools by reason of the operator forgetting to remove the gauge from the work spindle, after dividing stock, is eliminated.

One way in which the machine may be wired to secure the desired result is illustrated diagrammatically in Figure 4. 65 designates the starter button, which is normally open and 66 the stop button which is normally closed. 67 and 68 indicate the main lines. 70 designates the automatic stop which operates to stop the machine after the desired number of teeth have been cut in the gear and which may be of any usual or suitable construction. 71 and 72 are the cutter drive motor and the main drive motor, respectively, of the machine.

Assuming that the operator has gauged the blank and then put the stock-dividing gauge on the bracket 40, causing the bar 52 to make contact with the terminals 53 and 54, the machine can be started by pressing the starter button 65 to make contact with the terminals 73 and 74. The circuit is then from the main line 67 through the terminal 75, the line 76, the terminal 77, the line 78, the terminal 79, the line 80, the terminal 74, the terminal 73, the line 81, the terminal 82, the line 83 to one terminal 84 of a magnetic controller which may be of any usual or suitable construction. This controller includes an electro-magnet 85 and three switch arms 86, 87 and 88 which are connected to move together. When the starter button is pressed in, as already described, the electro-magnet is energized, the current passing from the terminal 84 through the coil of the electromagnet, thence to the terminal 90, the line 56, the terminal 54, the bar 52, the terminal 53, the line 55 to the terminal 91 of the automatic stop 70, which is closed, thence through the terminal 92 of the stop and the line 94 back to the main line 68.

When the electro-magnet 85 is energized, as described, it pulls the arm 88 over to cause that arm to make contact at 95. The arms 86 and 87 which are connected to the arm 88 are pulled over at the same time to make contact at 75 and 97, respectively. The starter button 65, as stated, is normally open, so that when the operator takes his finger off of the button, it springs open breaking contact at 73 and 74. The circuit remains closed, however, through the switch arm 88 and the terminal 95. The circuit is now from the main line 67 through the terminal 75, the line 76, the terminal 95, the switch arm 88, the terminal 98, the line 99, the terminal 100, the line 101, the terminal 102 of the stop 66 through the stop button to the terminal 82, thence through the line 83, the terminal 84, the coil of the electro-magnet 85, the terminal 90, the line 56, the terminal 54, the bar 52, the terminal 53, the line 55, the terminal 91 of the automatic stop 70, the terminal 92 of the stop and the line 94 to the main line 68. At the same time, current flows from the main line 67 through the terminal 75, the switch arm 86, the terminal 104, the line 105, and the terminal 106 and the line 107 to the two motors 71 and 72, thence through the line 108, the terminal 109, the line 110, the terminal 111, the heater coil 112, the terminal 113, the switch arm 87 and the terminal 97 to the main line 68. Thus, the cutter and main drive motors are started to put the machine into operation and as long as the electro-magnet 85 remains energized, the machine remains in operation, but if the stock-dividing gauge were to be removed from the bracket 40, the circuit would be broken and the machine would stop. The machine otherwise remains in operation until the automatic stop functions to break the contact at 91 and 92. It will be seen that the safety switch is open until the stock-dividing gauge is in position on the bracket 40 and that the machine cannot be started until the stock-dividing gauge is in position on this bracket. Hence, the operator must remove the stock-dividing gauge from the work spindle before he can start the machine. Thus, an absolute safety is provided, rendering it impossible for the operator to forget to remove the gauge from the work spindle and start the machine with the gauge on the work spindle.

115 designates a cover plate for the safety switch box, this plate is secured to the bracket 40 by the screws 116.

While the invention has been described in connection with a particular embodiment, the inventor has in contemplation various modifications and adaptations. The present application is intended to cover any adaptations or embodiments of the invention, following, in general, the principles of the invention and including such departure from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for producing gears, the combination with a work spindle and drive means for the work spindle, of a stock-dividing gauge adapted to be positioned on the work spindle for locating a gear blank angularly on the spindle, and a device normally preventing operation of the drive means but adapted to be rendered inoperative by the stock-dividing gauge when said gauge is brought into engagement therewith, said device being so located on the machine that the stock-dividing gauge must be removed from the work spindle in order to be brought into engagement with the device.

2. In a machine for producing gears, the combination with a work spindle and a drive for the work spindle, of a stock-dividing gauge adapted to be positioned on the work spindle for locating a gear blank angularly on the work spindle, and a shiftable member incorporated in the drive for the work spindle but continuously urged into inoperative position to render said drive inoperative, said member being adapted to be held in operative position to permit operation of said drive when the stock-dividing gauge is in operative engagement with said member and said member being so located on the machine that the stock-dividing gauge must be removed from the work spindle in order to bring the gauge into engagement with said member.

3. In a machine for producing gears, the combination with a work spindle and a drive for the same, of a stock-dividing gauge adapted to be positioned on the work spindle for locating a gear blank angularly on the work spindle, a shiftable member adapted to render said device operative or inoperative on movement in opposite directions, said member being moved into operative position when the stock-dividing gauge is brought into engagement therewith, means constantly urging said member into inoperative position, and a support in which the stock-dividing gauge may be positioned when removed from the work spindle so that the gauge is held in engagement with said shiftable member.

4. In a machine for producing gears, the combination with the work spindle and an electrical drive for the same, of a stock dividing gauge adapted to be positioned on the work spindle for locating a gear blank angularly on the work spindle, a normally open electrical switch incorporated in said electrical drive circuit and adapted, when open, to prevent starting of said drive, said switch being arranged so as to be closed when the stock-dividing gauge is brought into engagement therewith, and said switch being so located on the machine that the stock-dividing gauge must be removed from the work spindle in order to bring said gauge into engagement with the switch.

5. In a machine for producing gears, the combination with the work spindle and an electrical drive for the same, of a stock-dividing gauge adapted to be positioned on the work spindle for locating a gear blank angularly on the work spindle, a normally open electrical switch incorporated in the electrical drive circuit and adapted when open to open said circuit, said switch being arranged so as to be closed when the stock dividing gauge is in engagement therewith, and said switch being so located on the machine that the stock-dividing gauge must be removed from the work spindle in order to close the switch.

6. In a machine for producing gears, the combination with the work spindle and an electrical drive for the same, of a removable stock dividing gauge adapted to be positioned on the work spindle for locating a gear blank angularly on the spindle, a normally open switch incorporated in the circuit to said drive and adapted when open, to open said circuit but adapted to be closed by the stock-dividing gauge when the gauge is brought into operative relation therewith and a support in which said stock-dividing gauge must be positioned in order to bring it into operative relation with the switch.

LEONARD O. CARLSEN.